United States Patent
Asano et al.

(10) Patent No.: US 8,240,461 B2
(45) Date of Patent: Aug. 14, 2012

(54) PART SUPPLY APPARATUS

(75) Inventors: Junya Asano, Tochigi (JP); Yoichi Izawa, Tochigi (JP); Takayuki Motojima, Tochigi (JP); Katsumi Fujiwara, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 313 days.

(21) Appl. No.: 12/726,662

(22) Filed: Mar. 18, 2010

(65) Prior Publication Data

US 2010/0249991 A1    Sep. 30, 2010

(30) Foreign Application Priority Data

Mar. 25, 2009    (JP) ................................. 2009-074860

(51) Int. Cl.
*B65G 43/00*    (2006.01)
*B07C 5/00*    (2006.01)

(52) U.S. Cl. .................. 198/502.1; 198/550.6; 198/576; 198/959; 209/586; 209/592

(58) Field of Classification Search ............... 198/502.2, 198/550.01, 550.6, 575, 576, 703, 706, 778, 198/959; 209/555, 576, 586, 592, 621, 651, 209/659; 356/628
See application file for complete search history.

(56) References Cited

U.S. PATENT DOCUMENTS

| | | | | |
|---|---|---|---|---|
| 4,741,428 A | * | 5/1988 | Taniguchi et al. | 198/397.04 |
| 4,830,180 A | * | 5/1989 | Ferguson et al. | 198/836.3 |
| 5,305,895 A | * | 4/1994 | Hermann | 209/586 |
| 5,361,027 A | * | 11/1994 | Selleri | 324/226 |
| 5,460,271 A | * | 10/1995 | Kenny et al. | 209/576 |
| 5,590,976 A | * | 1/1997 | Kilheffer et al. | 404/72 |
| 5,655,667 A | * | 8/1997 | Isaacs | 209/539 |
| 5,753,866 A | * | 5/1998 | Ikeda et al. | 177/25.18 |
| 6,276,564 B1 | * | 8/2001 | Reich | 221/217 |
| 6,616,401 B2 | * | 9/2003 | Nakamura et al. | 414/811 |
| 6,944,511 B2 | * | 9/2005 | Bergo et al. | 700/95 |
| 7,004,330 B1 | * | 2/2006 | Tew et al. | 209/592 |
| 7,669,707 B2 | * | 3/2010 | Kenneway | 198/398 |

FOREIGN PATENT DOCUMENTS

JP    2000-233823    8/2000

* cited by examiner

*Primary Examiner* — Douglas Hess
(74) *Attorney, Agent, or Firm* — Rankin, Hill & Clark LLP

(57) ABSTRACT

A bolt supply apparatus (1) recognizes images of bolts conveyed by a conveyor (22) using a camera (24) and feeds the recognized bolts to a next operation step using a robot (26). Bolts to be conveyed from a hopper (10) through a spiral feeder (14) are temporarily stored in a first storage box (16). Weight of the first storage box (16) is measured by a first weight measuring device (18). When the first weight measuring device (18) measures a given weight, the bolts of the first storage box (16) are supplied to the conveyor (22).

4 Claims, 5 Drawing Sheets

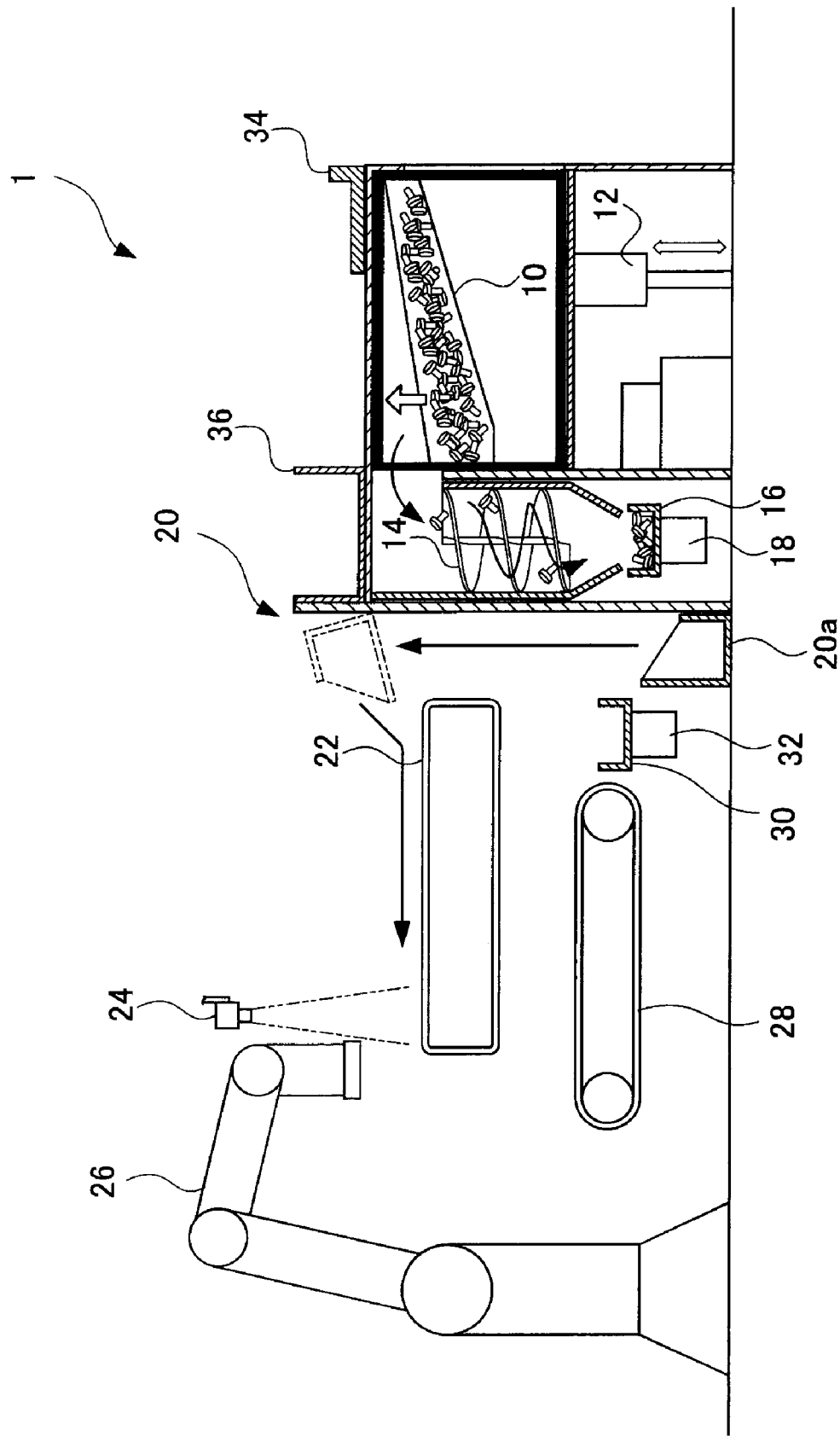

PART SUPPLY APPARATUS

BACKGROUND OF THE INVENTION

1. Field of the Invention

The present invention relates to a part supply apparatus for supplying various kinds of part.

2. Background Art

In a conventional assembling apparatus for assembling various parts into a product, parts conveyed by a part supply apparatus are recognized by a camera, an assembling robot moves to the parts recognized by the camera, takes out such parts from the part supply apparatus and inserts the parts into their given portions of the product. Parts, which could not have been recognized by the camera, are made to circulate again through a given conveying route and are then fed to the part supply apparatus.

There is proposed a technology relating to a part supply apparatus for supplying parts to an assembling robot (Patent Document 1). That is, the part supply apparatus includes an attitude arranging unit for arranging attitudes of parts. Specifically, after the attitudes of the parts are arranged by the attitude arranging unit, the parts are fed to their take-out position, the attitudes of the parts are recognized at the take-out position by a CCD camera and, when the attitudes of the parts are found within a given range of attitudes, the parts are taken out by the assembling robot. On the other hand, the parts, the attitudes of which are found not proper, are fed to the return conveyor side and are circulatingly moved back to the part supply apparatus.

Patent Document 1: JP-A-2000-233823

According to the technology disclosed in Patent Document 1, since the attitudes of parts are arranged at the take-out position by the attitude arranging unit before the attitudes of the parts are recognized by the CCD camera, the accuracy of the parts recognition by the CCD camera can be enhanced. Also, in the technology disclosed in Patent Document 1, as the attitude arranging unit, there is provided a mechanism for vibrating a shooter which constitutes the convey route of the parts.

However, although the general purpose property of the part supply apparatus can be expected to a certain degree due to provision of the attitude arranging unit, since some of parts are difficult to arrange their attitudes even when they are vibrated, the applicable range of the part supply apparatus is limited. Thus, there has been desired the development of a part supply apparatus which has a higher general purpose property.

SUMMARY OF THE INVENTION

One or more embodiments of the invention provide a part supply apparatus which can realize an enhanced general purpose property.

In accordance with one or more embodiments of the invention, a part supply apparatus (for example, a bolt supply apparatus 1 which will be discussed later) is provided with: storing means (for example, a hopper 10 which will be discussed later) for storing parts (for example, bolts which will be discussed later) therein; first conveying means (for example, a spiral feeder 14 which will be discussed later) for conveying the parts stored within the storing means; temporarily storing means (for example, a first storage box 16 which will be discussed later) for temporarily storing the parts conveyed by the first conveying means; second conveying means (for example, a second conveyor 22 which will be discussed later) for conveying the parts stored in the first storing means to a predetermined position; weight measuring means (for example, a first weight measuring device 18) for measuring the weight of the parts stored in the first storing means; supply means (for example, an elevator 20 which will be discussed later), when the measurement result of the weight measuring means satisfies a predetermined condition previously set according to the kind of the part, for supplying the parts stored within the temporarily storing means to the second conveying means; image recognizing means (for example, a camera 24 which will be discussed later) for recognizing the images of the parts conveyed to the predetermined position; and, automatic feed means (for example, a robot 26 which will be discussed later) for feeding the parts image-recognized by the image recognizing means to other predetermined positions one by one.

According to the above structure, there is provided a part supply apparatus which uses the image recognizing means (for example, a camera) to recognize the images of the parts conveyed by the second conveying means and also uses the automatic feed means (for example, a robot) to feed the image recognized parts to other positions, wherein parts of a given weight are supplied to the second conveying means which is used to convey the parts to the image recognizing means. This can eliminate a possibility that the parts can be supplied excessively to the part supply apparatus. Thus, the quantity of parts in the second conveying means can be adjusted to such quantity as can maintain the image recognition accuracy of the image recognizing means disposed on the downstream side. Also, to change the kind of parts, the specifications of the second conveying means and the weight to be measured by the weight measuring means may be changed according to the kind of part. In this manner, there is eliminated the need for use of a device for arranging the attitudes of the parts but, only by controlling the quantity of supply of bolts according to the weight measurement of the bolts, the recognition accuracy of the image recognizing means can be maintained. This makes it possible to provide a part supply apparatus which need not be specially designed for the specific shape and kind of a part but has an enhanced general purpose property.

Further, the part supply apparatus may further be provided with: third conveying means (for example, a collection conveyor 28 which will be discussed later) for conveying parts which could not have been image recognized by the image recognizing means; re-supply storing means (for example, a second storage box 30) for storing therein parts conveyed by the third conveying means; and, re-supply weight measuring means (for example, a second weight measuring device 32 which will be discussed later) for measuring the weight of parts stored in the re-supply storing means. The supply means, when the measurement result of the re-supply weight measuring means satisfies a predetermined condition previously set according to the kind of the parts, supplies parts stored in the re-supply storing means to the second conveying means.

According to the part supply apparatus of the embodiments of the invention, it is possible to provide a part supply apparatus which need not be specially designed for the specific shape and kind of a part but has an enhanced general purpose property.

Other aspects and advantages of the invention will be apparent from the following description, the drawings and the claims.

BRIEF DESCRIPTION OF THE DRAWINGS

FIG. 5 is an explanatory view of a hopper replacing operation to be carried out in the bolt supply apparatus shown in FIG. 1, when replacing an old hopper with a new hopper storing different kinds of bolt therein.

DETAILED DESCRIPTION OF THE EXEMPLARY EMBODIMENTS

An exemplary embodiment of the invention is described with reference to the accompanying drawings.

<Basic Structure>

Figure 1:
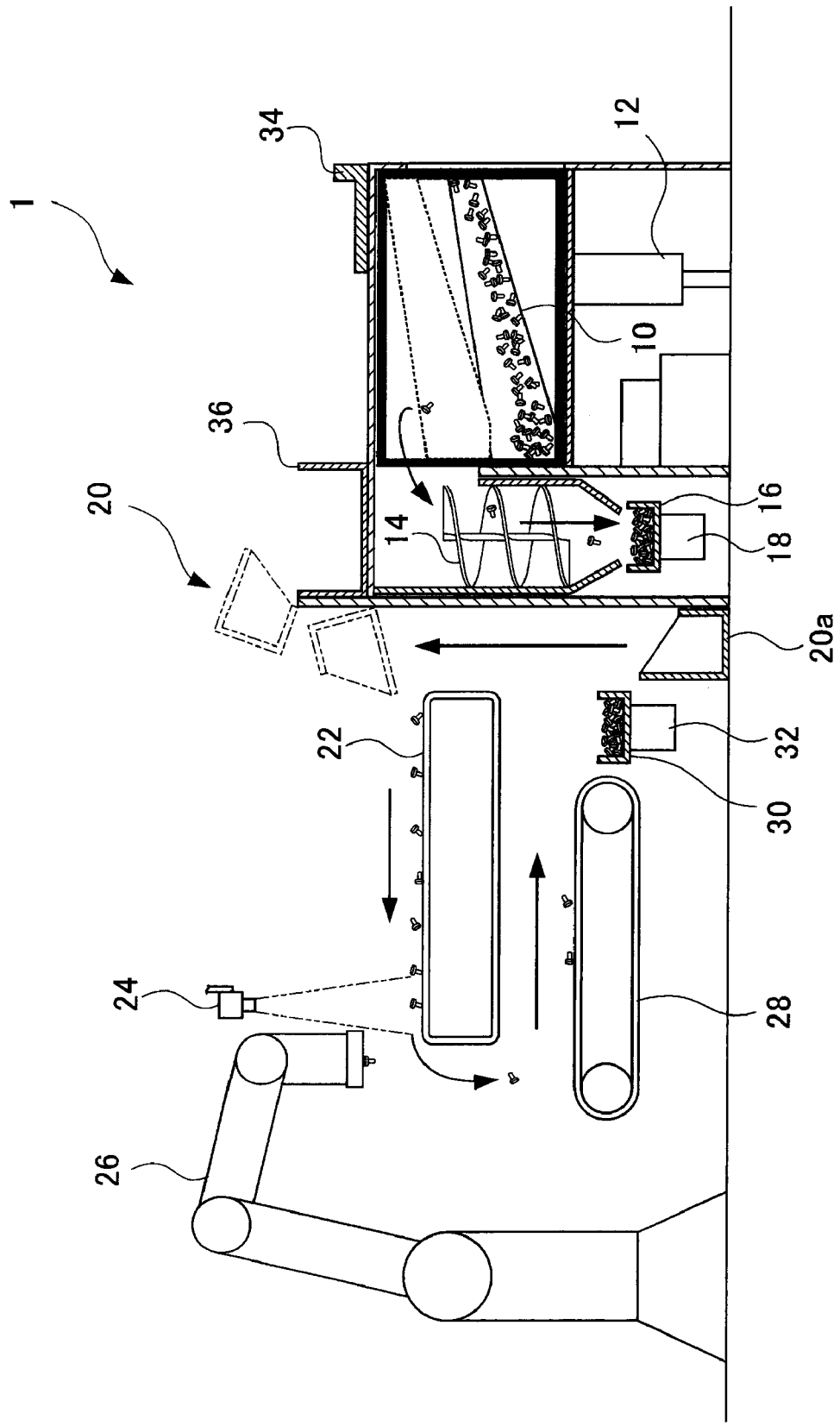
FIG. 1 is an explanatory view of a schematic structure of a bolt supply apparatus according to an exemplary embodiment of the invention.

FIG. 1 is an explanatory view of a schematic structure of a bolt supply apparatus 1 according to an exemplary embodiment of the invention. The bolt supply apparatus 1 is structured such that, it supplies bolts stored in a hopper 10 to a conveyor 22, recognizes the bolts being conveyed by the conveyor 22 using a camera 24, and takes out the bolts recognized by the camera 24 using a robot 26, thereby transporting the bolts to a next operating line.

Next, description will be given below more specifically of the present embodiment. The bolts are stored in the hopper 10, while the hopper 10 is provided on a lift 12. When the hopper 10 is lifted up to a conveying opening for a spiral feeder 14, the bolts stored in the hopper 10 are allowed to move along the inclined surface of the hopper 10 to the conveying side and, the bolts are fed through the conveying opening to the spiral feeder 14. The bolts fed from the hopper 10 to the spiral feeder 14 are fed along the feeder 14 and are thereby got out of their tangles; and then, they are stored into a first storage box 16.

The first storage box 16 is normally disposed on a first weight measuring device 18. The first weight measuring device 18 is used to measure the weights of the bolts fed to the first storage box 16 and transmit the measurement results to a control portion 100 (see FIG. 2). When the control portion 100 (see FIG. 2) monitors the measurement results of the first weight measuring device 18 and determines that the weight of the first storage box 16 has arrived at a given weight, the bolts stored within the first storage box 16 are fed to the lift box 20a of an elevator 20.

The elevator 20 is used to move up and down the lift box 20a between an initial position, where the bolts are fed from the first storage box 16, and a bolt supply position to the conveyor 22 or a bolt collection position for collecting the bolts into a collection box 36 disposed upwardly of the spiral feeder 14. Also, when the lift box 20a arrives at the bolt supply position to the conveyor 22, since the lift box 20a is inclined toward the conveyor 22, the bolts within the lift box 20a are supplied to the conveyor 22. When the lift box 20a arrives at the bolt collection position to the collection box 36, since the lift box 20a is inclined toward the collection box 36, the bolts within the lift box 20a are conveyed to the collection box 36.

The conveyor 22 conveys the bolts supplied from the lift box 20a in a direction of the position to be recognized by the camera 24. The camera 24 is disposed opposed to the downstream side end portion of the conveyor 22 in the bolt conveying direction. Data on photo images taken by the camera 24 are transmitted to the control portion 100 (see FIG. 2). In the control portion 100 (see FIG. 2), an image processing is carried out on the photo images to recognize whether bolts are present or not. And, when the bolts are recognized, the robot 26 takes out the bolts recognized by the camera 24 and feeds them to a next operating line.

Downwardly of the conveyor 22, there is disposed a collection conveyor 28, while bolts not recognized in the conveyor 22 by the camera 24 are conveyed to the collection conveyor 28. The bolts to be conveyed by the collection conveyor 28 are conveyed to a second storage box 30. Into the second storage box 30, there are stored bolts which have not been picked up by the robot 26, that is, bolts which have not been recognized by the camera 24.

The second storage box 30 is normally disposed on a second weight measuring device 32. The second weight measuring device 32 is used to measure the weight of bolts conveyed to the second storage box 30 and transmit the measurement result to the control portion 100 (see FIG. 2). When the control portion 100 (see FIG. 2) monitors the measurement result of the second weight measuring device 32 and determines that the weight of the second storage box 30 has arrived at a given weight, the bolts within the second storage box 30 are fed to the lift box 20a of the elevator 20.

An opening/closing plate 34 is used to open and close a supplement opening (not shown) formed in the upper portion of the hopper 10. When the supplement opening (not shown) is opened by sliding the opening/closing plate 34, the bolts can be supplemented to the hopper 10 through the supplement opening.

Into the collection box 36, there are stored the bolts which are left within the bolt supply apparatus 1 when the old hopper 10 is replaced with a new hopper 10 storing different kinds of bolt therein.

<Electrical Structure>

Figure 2:
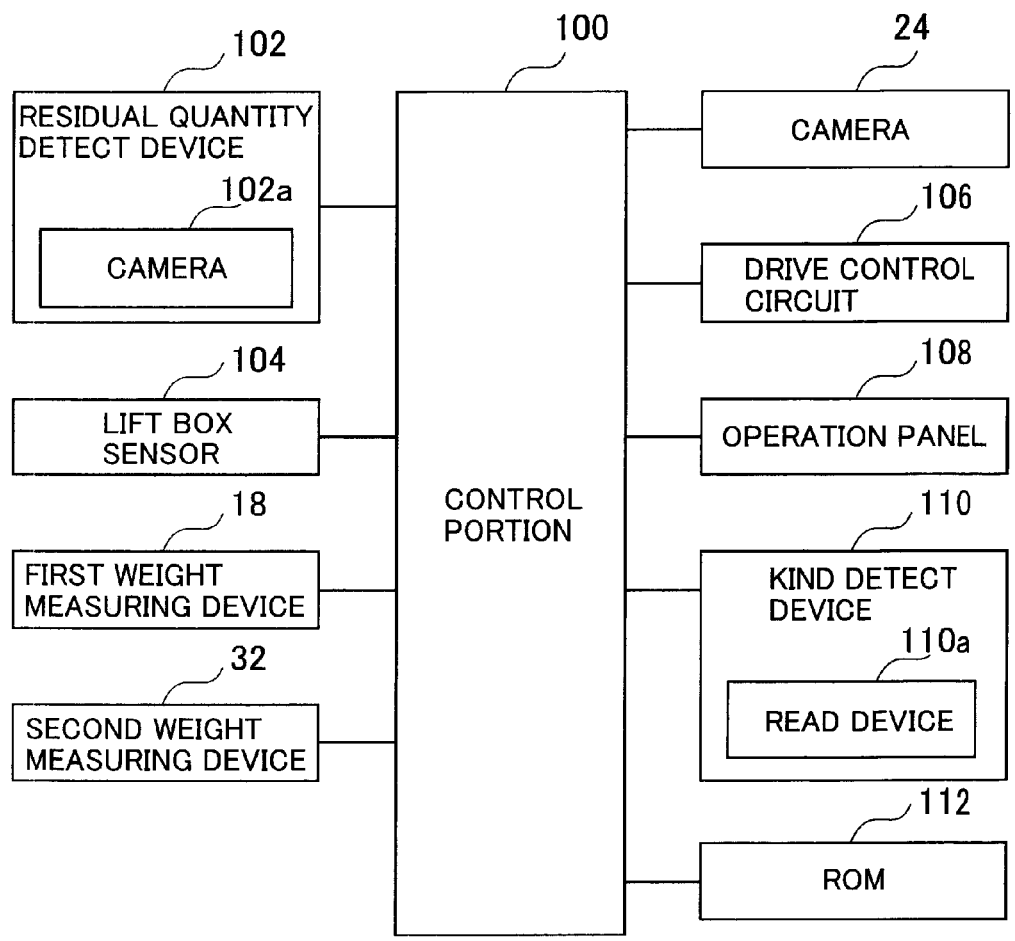
FIG. 2 is a block diagram of a structure of control circuits used in the bolt supply apparatus shown in FIG. 1.

FIG. 2 is a block diagram of the structure of control circuits used in the bolt supply apparatus 1 according to the embodiment of the invention. The control portion 100 controls the whole of the bolt supply apparatus 1. To the control portion 100, there are connected a residual quantity detect device 102, a lift box sensor 104, a first weight measuring device 18, a second weight measuring device 32, a camera 24, a drive control circuit 106, an operation panel 108, a kind detect device 110, a ROM 112 and the like.

The residual quantity detect device 102 includes a camera 102a which is used to take a picture of the whole of the conveyor 22. The camera 102 transmits data, which relate to the pictures taken by the camera 10, to the control portion 100. The control portion 100 carries out an image processing on the picture data to detect the quantity of bolts remaining in the conveyor 22. The lift box sensor 104 is constituted of, for example, an optical sensor which, when it detects that bolts are stored in the lift box 20a, transmits a detect signal to the control portion 100. The drive control circuit 106, according to an instruction given from the control portion 100, drives and controls the lift 12, elevator 20, conveyor 22, robot 26, collection conveyor 28, a device (not shown) for feeding bolts stored in the first storage box 16 and second storage box 30 to the lift box 20a, and the like. The operation panel 108, on receiving an input from outside, is operated to carry out various settings and inputs. Input signals, which correspond to the settings and inputs of the operation panel 108, are to be transmitted to the control portion 100. The kind detect device 110 includes a read device 110a for reading bar code members respectively holding therein information capable of identifying the kinds of bolts. And, onto the hopper 10, there is mounted a bar code member corresponding to the kind of bolt stored within the hopper 10; the read device 110a is mounted onto the main body of the bolt supply apparatus 1; and, when the hopper 10 is mounted on the bolt supply apparatus 1, the read device 110a reads the bar code member and transmits its read result to the control portion 100. The control portion 100 detects the kind of bolt according to the read data transmitted from the read device 110a. In ROM 112, there are stored various control programs for controlling the bolt supply apparatus 1, and data for relating the kind of bolt to the reference weight values that are measured by the first weight measuring device 18 and second weight measuring device 32. Here, the residual quantity detect device 102, lift box sensor 104 and kind detect device 110 are not limited to the above-mentioned structures but they can also have other structures, provided that they can attain the objects of these devices or sensor.

<Control of Conveyance of Bolts>

Next, description will be given below of the control of conveyance of bolts. When the bolt supply apparatus 1 is driven initially or bolts stored in the first storage box 16 are fed to the lift box 20a, in other words, when no bolt is stored in the first storage box 16, the control portion 100 drives the lift 12 and thus raises the hopper 10 to convey bolts to the first storage box 16 through the spiral feeder 14. In this case, the control portion 100 monitors the measurement result from the first weight measuring device 18 to check whether the first weight measuring device 18 has measured the reference weight value or not. When it is determined that the first weight measuring device 18 has measured the reference weight value, the control portion 100, for example, drives the lift 12 to move down the hopper 10: that is, the control portion 100 carries out such control that stops the conveyance of the bolts to the first storage box 16. When the control portion 100 does not determine that the first weight measuring device 18 has measured the reference weight value, it allows the bolts to be continuously conveyed to the first storage box 16.

Here, the above-mentioned reference weight value is previously determined according to the kind of bolt to be conveyed and is set for the value of such quantity as can maintain the image recognition accuracy of the camera 24. According to the present embodiment, the control portion 100 specifies the kind of bolts according to the read data from the kind detect device 110 and refers to the correspondence relation data stored in ROM 112 to read out a reference weight value corresponding to the kind of bolt, thereby setting the reference weight value automatically. However, the above-mentioned reference weight value can also be determined in such a manner that, through the external operation of the operation panel 108, there is set and input a reference weight value corresponding to the kind of bolt.

Next, the control portion 100 determines the quantity of remaining bolts according to the data from the residual quantity detect device 102 and also checks whether the residual bolt quantity has become smaller than a previously determined given quantity or not. And, when the control portion 100 determines that the residual bolt quantity has become smaller than the given quantity, the control portion 100 further checks according to the detect result of the lift box sensor 104 whether a bolt is stored in the lift box 20a or not. When the control portion 100 determines that a bolt is stored in the lift box 20a, the control portion 100 drives the elevator 20 to supply the bolt stored in the lift box 20a to the conveyor 22. When the control portion 100 determines that no bolt is stored in the lift box 20a, the control portion 100 feeds the bolt of the first lift box 16 to the lift box 20a. And, the control portion 100 drives the elevator 20 to supply the bolts stored in the lift box 20a to the conveyor 22. Further, the control portion 100 resumes such control that it drives the lift 12 to convey bolts to the first storage box 16 which is emptied.

When bolts being conveyed by the conveyor 22 arrive at the recognition position, the control portion 100 carries out an image recognition operation using the camera 24; and, the thus image recognized bolts are picked up by the robot 26, whereas the bolts the images of which are not recognized are stored into the second storage box 30 through the collection conveyor 28.

Also, the control portion 100 monitors the measurement result from the second weight measuring device 32 to check whether the second weight measuring device 32 has measured the reference weight value or not. When it is determined that the reference weight value has been measured, the control portion 100 carries out such control that it feeds bolts stored in the second storage box 30 to the lift box 20a. Even when the lift box 20a is empty and the first weight measuring device 18 has measured the reference weight value, unless the control portion 100 determines that the residual bolt quantity has become smaller than a given quantity, the bolts stored in the first storage box 16 are not to be fed from the first storage box 16. On the other hand, the bolts stored in the second storage box 30, regardless of the check result of the residual bolt quantities by the control portion 100, are to be fed from the second storage box 30 to the lift box 20a at the time when the second weight measuring device 32 measures the reference weight value. That is, according to the present embodiment, assuming that the first and second storage boxes 16 and 30 both store therein bolts corresponding to the reference weight value, the control portion 100 carries out such control that the bolts in the second storage box 30 are fed preferentially to the lift box 20a.

As described above, according to the present embodiment, bolts, the images of which are not recognized by the camera 24, are supplied again to the conveyor 22 through the collection conveyor 28, second storage box 30 and lift box 20a. In other words, bolts supplied to the conveyor 22, unless they are picked up by the robot 26, are circulatingly moved.

<Hopper Replacing Operation>

Figure 3:
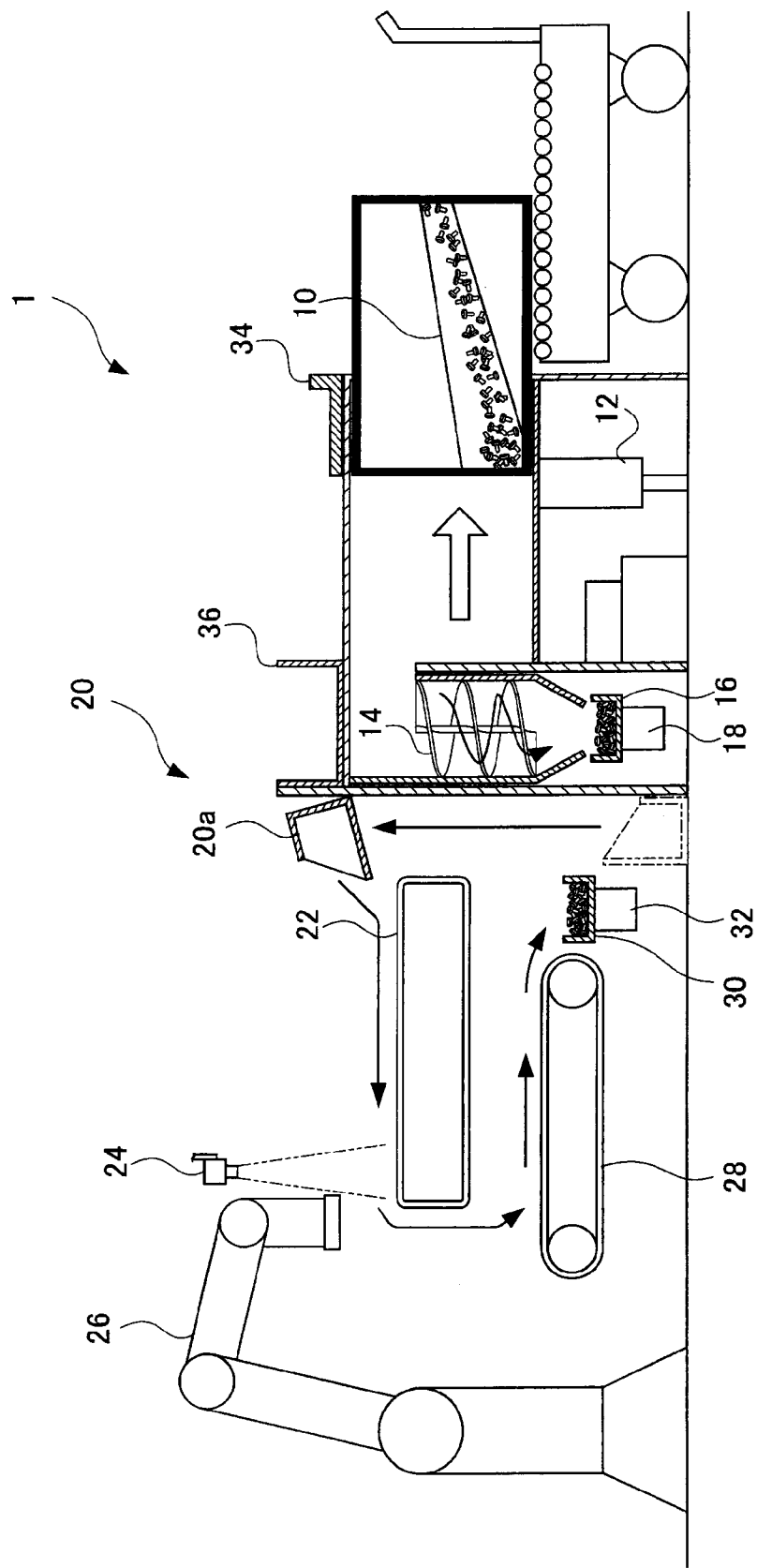
FIG. 3 is an explanatory view of a hopper replacing operation to be carried out in the bolt supply apparatus shown in FIG. 1.

Next, description will be given below of an operation to replace the hopper 10 with a hopper 10 storing therein bolts of the same kind with reference to FIG. 3.

Firstly, by operating the operation panel 108, there is executed an input to the effect that the hopper 10 is replaced with a new hopper 10. According to this input, the control portion 100 operates a safety mechanism included in the bolt supply apparatus 1 and drives the lift 12 to move down the hopper 10, thereby setting a state where the hopper 10 can be removed. And, as shown in FIG. 3, the hopper 10 is separated from the main body of the bolt supply apparatus 1 using an exclusive cart. In this case, bolts remaining in the spiral feeder 14 are stored into the first storage box 16. And, bolts stored in the first storage box 16 or in the second storage box 30 are fed to the lift box 20a to thereby continue the supply of bolts to the robot 26.

And, a new hopper 10 is mounted on the main body of the bolt supply apparatus 1 using the exclusive cart, the operation panel 108 is operated to execute an input to the effect that the replacement of the old hopper 10 with the new hopper 10 is completed, whereby supply of the bolts can be continued.

Figure 4:
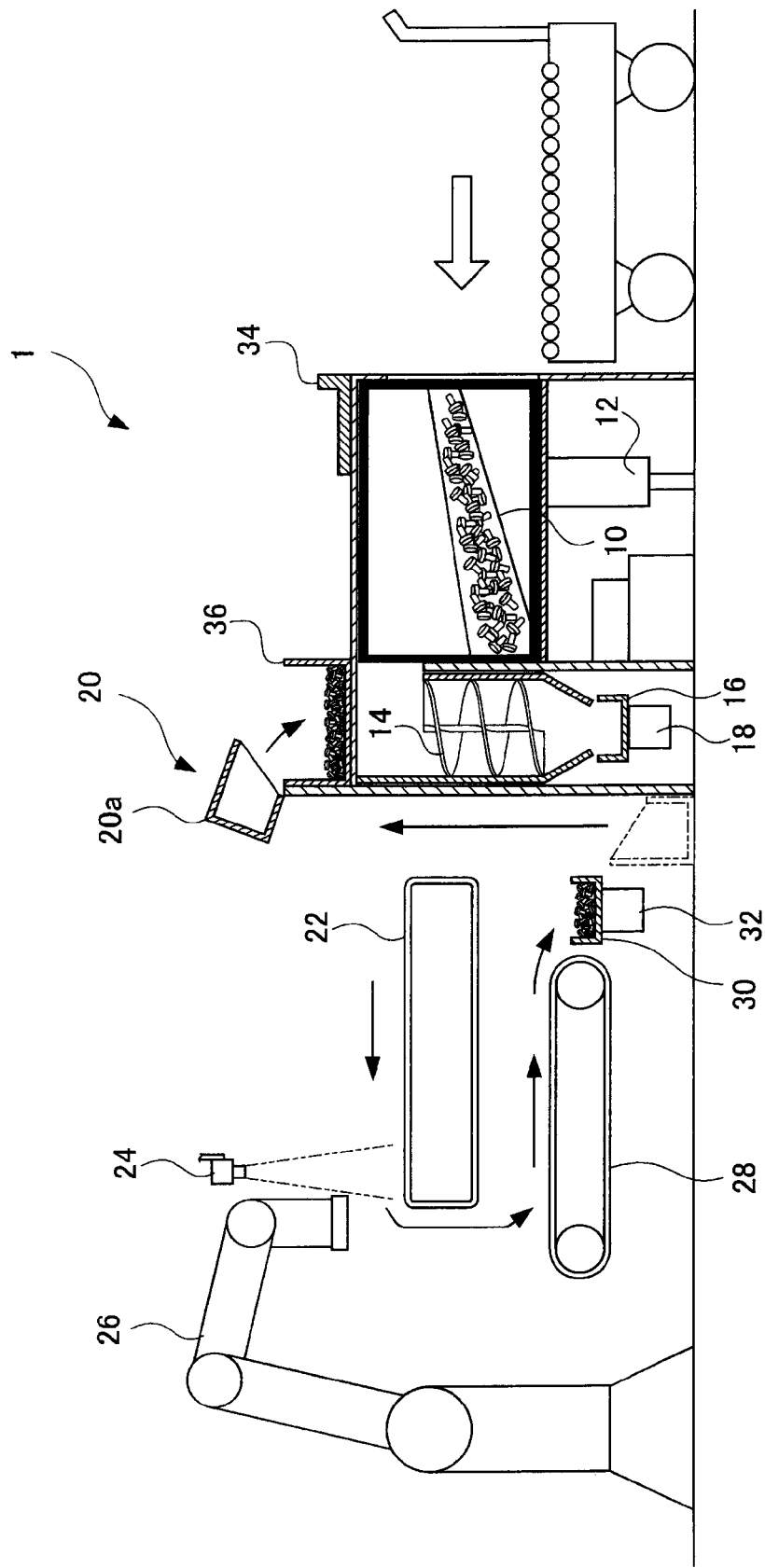
FIG. 4 is an explanatory view of a hopper replacing operation to be carried out in the bolt supply apparatus shown in FIG. 1, when replacing an old hopper with a new hopper storing different kinds of bolt therein.

Next, description will be given below of an operation to replace the old hopper 10 with a new hopper 10 storing therein bolts of the same kind with reference to FIGS. 3 and 4. Firstly, as shown in FIG. 3, the old hopper 10 is removed and, as shown in FIG. 4, a new hopper 10 is mounted. In this case, the read data of the bar code by the kind detect device 110 is transmitted to the control portion 100. The control portion 100 compares the kind of a bolt corresponding to the read data from the kind detect device 110 with the kind of a bolt corresponding to such read data of the bar code mounted on the hopper 10 before removed as stored in a memory (not shown), thereby checking whether the two kinds are the same or not. When it is determined that they are not the same, the control portion 100 starts the operation to collect the remaining bolts. That is, as shown in FIG. 4, the remaining bolts are fed to the lift box 20a and the remaining bolts within the lift box 20a are collected into the collection box 36 using the elevator 20.

After completion of the collection of the remaining bolts, as the need arises, the conveyor 22 and robot 26 are adjusted. And, the control portion 100 moves up the lift 12 and, as shown in FIG. 5, it starts the supply of new bolts; and, from now on, the bolts supply operation is continued according to the above-mentioned convey control. Here, after the replacement of the hopper 10, the control portion 100 checks the kind of bolt according to the image data initially provided by the camera 24; and, it compares the check result with the bolt kind according to the read data from the kind detect device 110 and, when they are not coincident, the control portion 100 may give an alarm to thereby stop the bolt supply apparatus 1 temporarily.

According to the thus structured present embodiment, in the bolt supply apparatus 1 which recognizes the images of bolts conveyed by the conveyor 22 using the camera 24 and feeds the image-recognized bolts to a next operation step using the robot 26, bolts of a given weight can be supplied to the conveyor 22 which is used to convey the bolts. This can eliminate a possibility that the bolts can be supplied excessively to the conveyor 22. Thus, the quantity of bolts in the conveyor 22 can be adjusted to such quantity as can maintain the image recognition accuracy of the camera 24 disposed on the downstream side. Also, to change the kind of bolt, the specifications of the conveyor and the weight to be measured by the first and second weight measuring devices 18 and 32 may be changed according to the kind of bolt. In this manner, there is eliminated the need for use of a device for arranging the attitudes of the bolts but, only by controlling the quantity of bolts to be supplied according to the weight measurement of the bolts, the recognition accuracy of the camera 24 can be maintained. This makes it possible to provide a bolt supply apparatus which is not specially designed for the specific shape and kind of a bolt but has an enhanced general purpose property.

While description has been made in connection with specific exemplary embodiment of the invention, it will be obvious to those skilled in the art that various changes and modification may be made therein without departing from the present invention. For example, the supply apparatus of the invention can supply other parts than the bolt, for example, a seat and a guide. It is aimed, therefore, to cover in the appended claims all such changes and modifications falling within the true spirit and scope of the present invention.

DESCRIPTION OF REFERENCE NUMERALS AND SIGNS

1: Bolt supply apparatus
10: Hopper
12: Lift
14: Spiral feeder
16: First storage box
18: First weight measuring device
20: Elevator
20a: Lift box
22: Conveyor
24: Camera
26: Robot
28: Collection conveyor
30: Second storage box
32: Second weight measuring device
36: Collection box
100: Control portion
108: Operation panel
112: ROM

What is claimed is:

1. A part supply apparatus comprising:
storing means for storing parts therein;
first conveying means for conveying the parts stored within the storing means;
temporarily storing means for temporarily storing the parts conveyed by the first conveying means;
second conveying means for conveying the parts stored in the first storing means to a predetermined position;
weight measuring means for measuring a weight of the parts stored in the first storing means;
supply means for supplying the parts stored within the temporarily storing means to the second conveying means when the weight of the parts determined by the weight measuring means satisfies a predetermined condition previously set according to a kind of the parts;
image recognizing means for recognizing images of the parts conveyed to said predetermined position; and
automatic feed means for feeding the parts recognized by the image recognizing means to other predetermined positions one by one.

2. The part supply apparatus according to claim 1, further comprising:
third conveying means for conveying the parts which are not recognized by the image recognizing means;
re-supply storing means for storing therein parts conveyed by the third conveying means; and
re-supply weight measuring means for measuring the weight of parts stored in the re-supply storing means,
wherein the supply means supplies the parts stored in the re-supply storing means to the second conveying means, when the measurement result of the re-supply weight measuring means satisfies a predetermined condition previously set according to the kind of the parts.

3. A part supply apparatus comprising:
a hopper configured to store parts therein;
a feeder configured to convey the parts stored within the hopper;
a first storage box configured to temporarily store the parts conveyed by the feeder;
a first weight measuring device configured to measure a weight of the parts stored in the first storage box;
a lift box, wherein the parts stored within the first storage box is supplied to the lift box when a measurement result of the first weight measuring device satisfies a predetermined condition;
a conveyor configured to convey the parts from the lift box to a predetermined position;
a camera configured to recognize images of the parts conveyed to said predetermined position; and
a robot configured to feed the parts recognized by the camera to other predetermined positions one by one.

4. The part supply apparatus according to claim 3, further comprising:
a collection conveyor configured to convey the parts which are not, recognized by the image recognizing means;
a second storage box configured to store therein the parts conveyed by the collection conveyor; and a second weight measuring device configured to measure weight of the parts stored in the second storage box, wherein the lift box is configured to supply the parts stored in the second storage box to the conveyor, when the measurement result of the second weight measuring device satisfies a predetermined condition.

* * * * *